United States Patent
Feng et al.

(10) Patent No.: US 9,135,678 B2
(45) Date of Patent: Sep. 15, 2015

(54) METHODS AND APPARATUS FOR INTERFACING PANORAMIC IMAGE STITCHING WITH POST-PROCESSORS

(71) Applicant: Adobe Systems Incorporated, San Jose, CA (US)

(72) Inventors: Dong Feng, Beijing (CN); Jen-Chan Chien, Saratoga, CA (US); Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 312 days.

(21) Appl. No.: 13/677,016

(22) Filed: Nov. 14, 2012

(65) Prior Publication Data

US 2013/0243351 A1    Sep. 19, 2013

Related U.S. Application Data

(60) Provisional application No. 61/612,851, filed on Mar. 19, 2012.

(51) Int. Cl.
*G06K 9/36* (2006.01)
*G06T 3/40* (2006.01)
*G06T 3/00* (2006.01)
*G06T 5/00* (2006.01)

(52) U.S. Cl.
CPC ............ *G06T 3/4038* (2013.01); *G06T 3/0062* (2013.01); *G06T 5/006* (2013.01); *G06T 2200/21* (2013.01); *G06T 2200/32* (2013.01)

(58) Field of Classification Search
CPC ..... G06T 3/0062; G06T 3/4038; G06T 5/006; G06T 2200/21; G06T 2200/32
See application file for complete search history.

(56) References Cited

U.S. PATENT DOCUMENTS

| | | | |
|---|---|---|---|
| 6,044,181 A * | 3/2000 | Szeliski et al. | 382/284 |
| 6,157,747 A | 12/2000 | Szeliski et al. | |
| 6,359,617 B1 | 3/2002 | Xiong | |
| 6,486,908 B1 | 11/2002 | Chen et al. | |
| 6,764,233 B2 | 7/2004 | Bean et al. | |
| 6,785,427 B1 | 8/2004 | Zhou | |
| 7,006,707 B2 | 2/2006 | Peterson | |
| 7,103,236 B2 | 9/2006 | Peterson | |
| 7,317,473 B2 | 1/2008 | Chen et al. | |
| 7,623,623 B2 | 11/2009 | Raanes et al. | |
| 8,194,993 B1 * | 6/2012 | Chen et al. | 382/254 |
| 8,391,640 B1 * | 3/2013 | Jin | 382/284 |
| 2002/0114536 A1 | 8/2002 | Xiong et al. | |

(Continued)

OTHER PUBLICATIONS

U.S. Appl. No. 11/610,099, filed Dec. 12 2006, John W. Peterson.

(Continued)

*Primary Examiner* — Stephen R Koziol
*Assistant Examiner* — Jonathan S Lee
(74) *Attorney, Agent, or Firm* — Wolfe-SBMC

(57) ABSTRACT

Methods and apparatus for describing a projection model, used by a panoramic image stitching module to generate panoramic images and for communicating the projection model to other processes. A post-processing module may access and use the projection model provided by the panoramic image stitching module to perform one or more post-processing methods on the panoramic image, rather than requiring the user to input the projection model via a user interface or requiring the post-processing module to estimate the projection model according to a mathematical analysis of the panoramic image.

21 Claims, 6 Drawing Sheets

(56) References Cited

U.S. PATENT DOCUMENTS

| | | |
|---|---|---|
| 2002/0118890 A1* | 8/2002 | Rondinelli .................... 382/276 |
| 2002/0135672 A1 | 9/2002 | Sezan et al. |
| 2003/0068098 A1* | 4/2003 | Rondinelli et al. ........... 382/276 |
| 2003/0095338 A1* | 5/2003 | Singh et al. ................... 359/725 |
| 2004/0046888 A1* | 3/2004 | Jan et al. ...................... 348/335 |
| 2004/0095357 A1 | 5/2004 | Oh et al. |
| 2004/0196282 A1 | 10/2004 | Oh |
| 2005/0063608 A1 | 3/2005 | Clarke et al. |
| 2005/0099494 A1 | 5/2005 | Deng et al. |
| 2006/0029290 A1 | 2/2006 | Edwards |
| 2006/0171702 A1 | 8/2006 | Guillou et al. |
| 2006/0203959 A1 | 9/2006 | Spartiotis et al. |
| 2006/0262184 A1 | 11/2006 | Peleg et al. |
| 2008/0074500 A1 | 3/2008 | Chen et al. |
| 2008/0143748 A1 | 6/2008 | Jin et al. |
| 2008/0144973 A1 | 6/2008 | Jin |
| 2013/0121525 A1* | 5/2013 | Chen et al. .................... 382/100 |

OTHER PUBLICATIONS

Agarwala, A., et al., "Interactive digital photomontage," ACM Transactions on Graphics (Proc. SIGGRAPH), 23(3), 294-302, 2004.

Szeliski, Richard, "Image Alignment and Stitching: A Tutorial," Microsoft Technical Report MSR-TR-2004-92, Dec. 10, 2006.

U.S. Appl. No. 12/040,504, filed Feb. 29 2008, Hailin Jin.

* cited by examiner

METHODS AND APPARATUS FOR INTERFACING PANORAMIC IMAGE STITCHING WITH POST-PROCESSORS

PRIORITY INFORMATION

This application claims benefit of priority of U.S. Provisional Application Ser. No. 61/612,851 entitled "Methods and Apparatus for Interfacing Panoramic Image Stitching with Post-Processors" filed Mar. 19, 2012, the content of which is incorporated by reference herein in its entirety.

BACKGROUND

Conventionally, post-processing of panoramic images generated by panoramic image stitching technology has been limited to relatively simple functions such as crop and re-size. However, new methods for post-processing panoramic images may be provided in image processing applications, and other new post-processing methods may be developed in the future. These post-processing methods may desire or need to use characteristics of the projections used in creating images including panoramic images. However conventional panoramic image stitching technology does not save or communicate the projection information used to generate a panoramic image, and thus this information is not directly available to post-processors. A post-processing module may thus rely on user input to specify various characteristics or parameters of the projection in a panoramic image. However, this projection information is complex and not easily understood by the general user, making the development of user interfaces to gather this information from the user difficult, and such an interface may be difficult to use for the general user.

SUMMARY

Various embodiments of methods and apparatus for interfacing panoramic image stitching technology with technology that implements post-processing of the panoramic images generated by the panoramic image stitching technology are described. Embodiments of an interface are described via which a panoramic image stitching process (which may be implemented, and is referred to herein, as a panoramic image stitching module) communicates information related to panoramic images generated thereby to one or more post-processing methods (which may be implemented, and are referred to herein, as post-processing modules). The information communicated by the panoramic image stitching module via the interface may be used by the post-processing module(s) when performing various post-processing method(s) on the panoramic images.

Embodiments may provide methods for describing the parameters of a projection method, collectively referred to as a projection model, used by a panoramic image stitching module to generate panoramic images and for communicating the projection model to other processes such as post-processors that may be used to apply various post-processing techniques to panoramic images. A post-processing module may be configured to access and use the projection model provided by the interface method to perform one or more post-processing methods on the panoramic image without requiring the user to input the projection information via a user interface and without requiring the post-processor to estimate the projection model according to a mathematical analysis of the panoramic image.

Figure 1A:
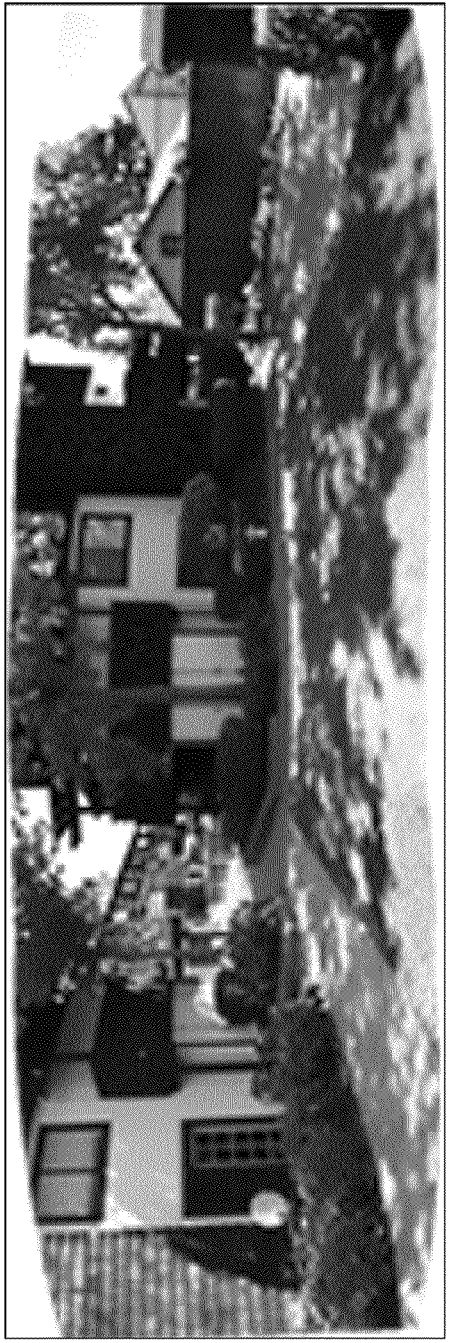
FIGS. 1A and 1B shows examples of panoramic images generated by panoramic image stitching technology.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for interfacing panoramic image stitching technology with technology that implements post-processing of the panoramic images generated by the panoramic image stitching technology are described. Embodiments of an interface are described via which a panoramic image stitching process (which may be implemented, and is referred to herein, as a panoramic image stitching module) communicates information related to panoramic images generated thereby to one or more post-processing methods (which may be implemented, and are referred to herein, as post-processing modules). The information communicated by the panoramic image stitching module via the interface may be used by the post-processing module(s) when performing various post-processing method(s) on the panoramic images. Conventional panoramic image stitchers do not provide a method for communicating this information to post-processing tasks.

A photograph, or image, may be viewed as a projection of a scene onto a plane by various optical (camera) or mathematical approaches. Conceptually, the method of projection may be performed by the following steps:

The scene is projected to the surface of a sphere at the center of which the observer (or camera) stands. This sphere may be referred to as the viewing sphere. Straight rays are projected from each point of the scene to the sphere's center.

The surface of the sphere is then projected to a plane, by straight or non-straight rays.

Figure 1B:
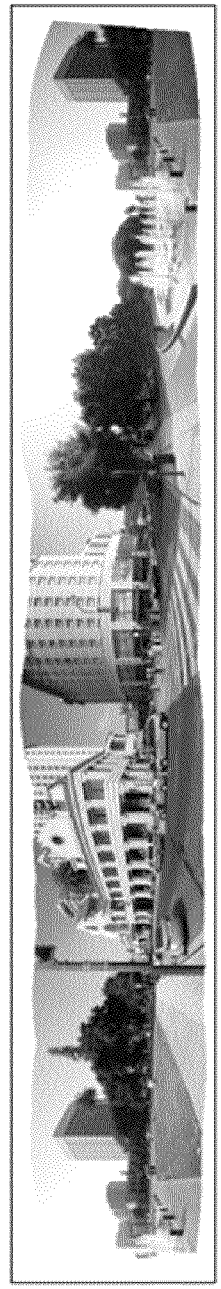

The above general method for performing a projection may be used in a panoramic image stitching technique to generate panoramic images. In the panoramic image stitching technique, multiple input images are projected onto a virtual sphere as described above, and then at least a portion of the sphere is projected onto a plane. The projection onto the plane is the panoramic image that is output by the panoramic image stitching module. FIGS. 1A and 1B show examples of such a panoramic image, and are not intended to be limiting.

From the above, parameters of the projection method used by a panoramic image stitching technique to generate a panoramic image include at least:

The radius of the viewing sphere,

The location and position of the plane, relative to the sphere. The plane and the sphere are typically, but not necessarily, contacted tangentially.

The characteristics of the projecting rays used in projecting the surface of the sphere onto the plane.

Collectively, the parameters of the projection method may be referred to as the projection model. Various methods for post-processing panoramic images may be able to use one or more of the parameters of the projection model when working on the panoramic images. However, while conventional panoramic image stitchers may have or may be able to obtain this information as part of the image stitching process, conventionally the projection model is not saved and is not communicated to other processes or modules by the panoramic image stitching module.

Embodiments may provide methods for describing the projection model used by a panoramic image stitcher to generate panoramic images and for communicating the projection model to other processes such as post-processors that may be used to apply various post-processing techniques to panoramic images. A post-processing module may use the projection model provided by the interface method to perform one or more post-processing methods on the panoramic image, rather than requiring the user to input the information via a user interface or requiring the post-processor to try to estimate the projection model from mathematical analysis of the panoramic image itself Thus, the effort in designing and implementing the user interface for the post-processing module may be reduced, the user is not required to understand and provide complex projection information used by the post-processing module, and the post-processing module is not required to spend time and resources trying to estimate the projection model according to a mathematical analysis of the panoramic image.

Thus, at least some embodiments may include a panoramic image stitcher configured to generate a panoramic image according to a projection model and to communicate the projection model used to generate the panoramic image to external processes, as well as one or more post-processors configured to receive the projection model communicated by the panoramic image stitcher and to perform one or more post-processing methods on the respective panoramic image according to the received projection model without obtaining user input specifying the projection model and without the post-processor estimating the projection model for the panoramic image according to a mathematical analysis of the panoramic image.

Interface Details

An example panoramic image stitching process for generating panoramic images, implemented by a panoramic image stitching module, may be performed as follows.

The panoramic image stitching module receives two or more images. For example, the images may be photographs of a scene captured using a camera, which may be mounted on a tripod, and an image capture process to capture the photos that results in each photograph capturing a different view of and different portions of the scene. There may be some overlap between adjacent images.

The panoramic image stitching module then reverse-projects the input images onto a common viewing sphere. This viewing sphere is not necessary the same sphere used by each individual input image. Thus, the viewing sphere is a "virtual" viewing sphere. The virtual viewing sphere may share a common center with the viewing spheres of the individual input images. Thus, this may be equivalent to performing a reverse-projection of each individual input image onto its own sphere, and then projecting each sphere to the virtual viewing sphere.

The panoramic image stitching module then projects the surface of the virtual viewing sphere to a plane to form the flat panoramic image.

In at least some embodiments, the projection model used by the panoramic image stitching module to generate a panoramic image includes at least the following parameters:

- The characteristics (e.g., radius) of the virtual viewing sphere.
- The location and position of the plane (i.e. the final panorama photo) relative to the virtual viewing sphere. Since the plane and sphere are typically contacted tangentially, the relative location and position may be depicted by the coordinate of the contact point in terms of the Descartes coordinate on the panorama photo (in absolute pixels or normalized to within [0.0, 1.0]).
- The characteristics of the projection rays used to project the virtual viewing sphere onto the plane.

Embodiments may provide an interface method that enables the panoramic image stitching module to communicate the projection model to post-processors. In at least some embodiments, the projection model may be stored as metadata for the respective panoramic image. In at least some embodiments, the metadata may be stored according to Adobe® eXtensible Metadata Platform (XMP) technology. However, other metadata formats or technologies may be used in some embodiments. In at least some embodiments, a namespace or similar structure may be defined to which panoramic image stitching information including but not limited to the projection model may be stored. For example, in some embodiments, the namespace may be a namespace as defined in XMP technology.

In at least some embodiments, one or more of the following metadata parameters may be defined. The parameters collectively define the projection model for a respective panoramic image. Note that the following is not intended to be limiting:

- A "VirtualFocalLength" entry to specify the radius of the virtual viewing sphere.
- A pair of entries, "VirtualImageXCenter" and "VirtualImageYCenter", that specify the point where the plane contacts the viewing sphere (i.e., the tangent point) in terms of the normalized coordinate of the panoramic image. In at least some embodiments, the values may be normalized to the range 0.0 to 1.0.
- A "Transformation" entry. In at least some embodiments, this entry indicates the projection rays in terms of a set of predefined transformation types understood by the panoramic image stitching module and a post-processing module that may access the information. The post-processing module should interpret the predefined transformation types in accordance with the panoramic image stitching module. In at least some embodiments, the predefined transformation types may include perspective transformation, cylindrical transformation, and spherical transformation. In at least some embodiments, the transformation entry may indicate the types as strings—e.g., "perspective", "cylindrical", and "spherical". However, other methods may be used to indicate the transformation types in the transformation entry.

In at least some embodiments, instead of or in addition to indicating transformation types using a string or other method, which requires that both the panoramic image stitching module and the post-processing module understands the type indicators used, a generalized approach may be used that does not require both modules to understand the type definitions. For example, in some embodiments, a general mathematical function that maps a [longitude, latitude] point on the virtual viewing sphere to a point (e.g., Descartes coordinates) on the plane (i.e. panoramic image) may be used to specify the transformation used in the projection model.

When the panoramic image stitching module saves a panoramic image, at least one or more of the above metadata entries may be generated and stored as metadata for the panoramic image. When a post-processing module accesses a panoramic image generated by the panoramic image stitching module, the post-processor can access the metadata for the panoramic image to access the above-described metadata entries that describe the projection characteristics (i.e., the projection model) used to generate the image.

In at least some embodiments, the projection model for a panoramic image may be stored by the panoramic image stitching module as metadata for the panoramic image, which can later be accessed by a post-processing module. Alternatively, in at least some embodiments, the projection model may be passed directly from the panoramic image stitching module to a post-processing module. Thus, the projection model can be directly or indirectly provided to other modules, in various embodiments.

In addition to its use by post-processing modules, note that the projection model stored as metadata with a panoramic image according to embodiments is also accessible to the panoramic image stitching module if the module is later used to open the stored panoramic image.

EXAMPLE METADATA

The following is an example of what the metadata for communicating the projection model used to generate a respective panoramic image may look like, in some embodiments, and is not intended to be limiting:

```
<rdf:Description rdf:about="">
    xmlns:panorama="[the namespace]">
    <panorama:Transformation>Spherical</panorama:Transformation>
    <panorama:VirtualFocalLength>0.367370</
    panorama:VirtualFocalLength>
    <panorama:VirtualImageXCenter>0.614647</
    panorama:VirtualImageXCenter>
    <panorama:VirtualImageYCenter>0.158734</
    panorama:VirtualImageYCenter>
</rdf:Description>
```

The above example indicates that, for the respective panoramic image, the virtual focal length is 0.367370, the center is at (0.614647, 0.158734) (which may be multiplied by the width of the images), and that the projection model is Spherical.

Figure 2:
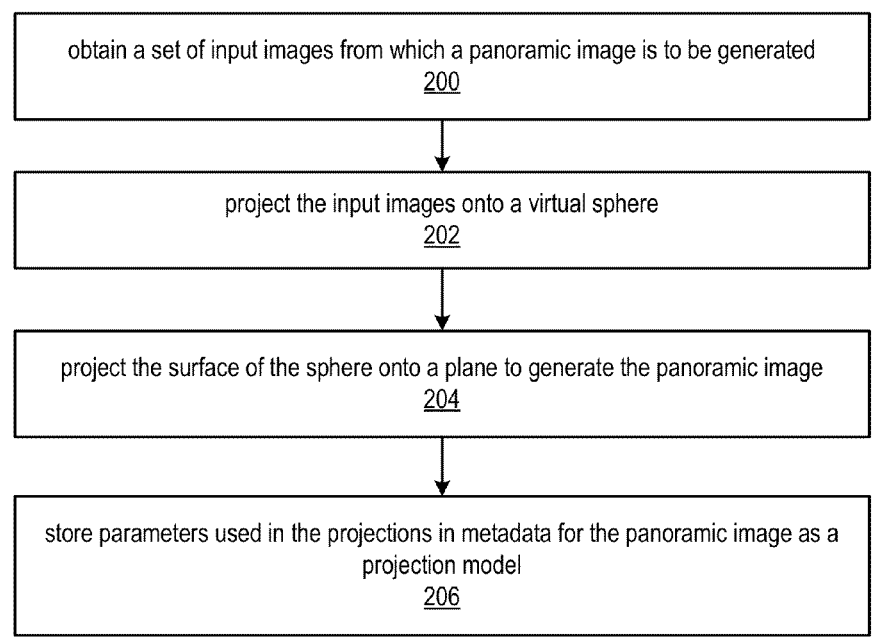
FIG. 2 is a flowchart of a method that may be implemented in a panoramic image stitching module to generate and store projection models used for generating panoramic images, according to at least some embodiments.
Figure 3:
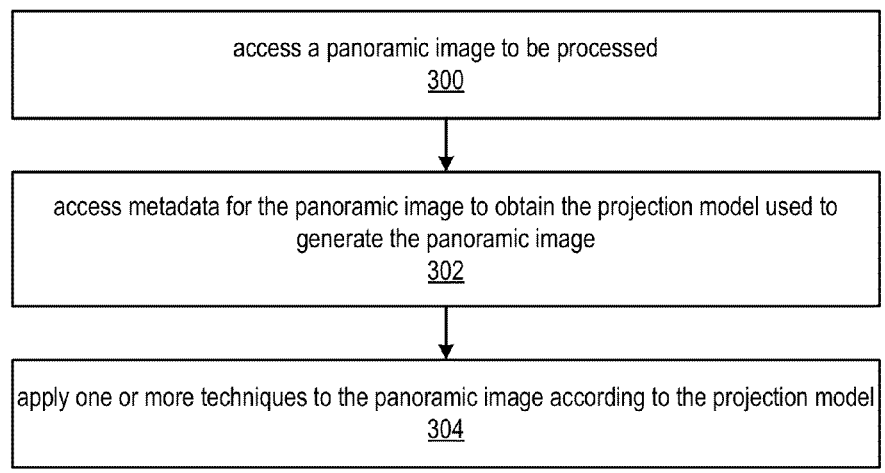
FIG. 3 is a flowchart of a method that may be implemented in a post-processing module to access projection models generated and stored as metadata by a panoramic image stitching module, according to at least some embodiments.
Figure 4:
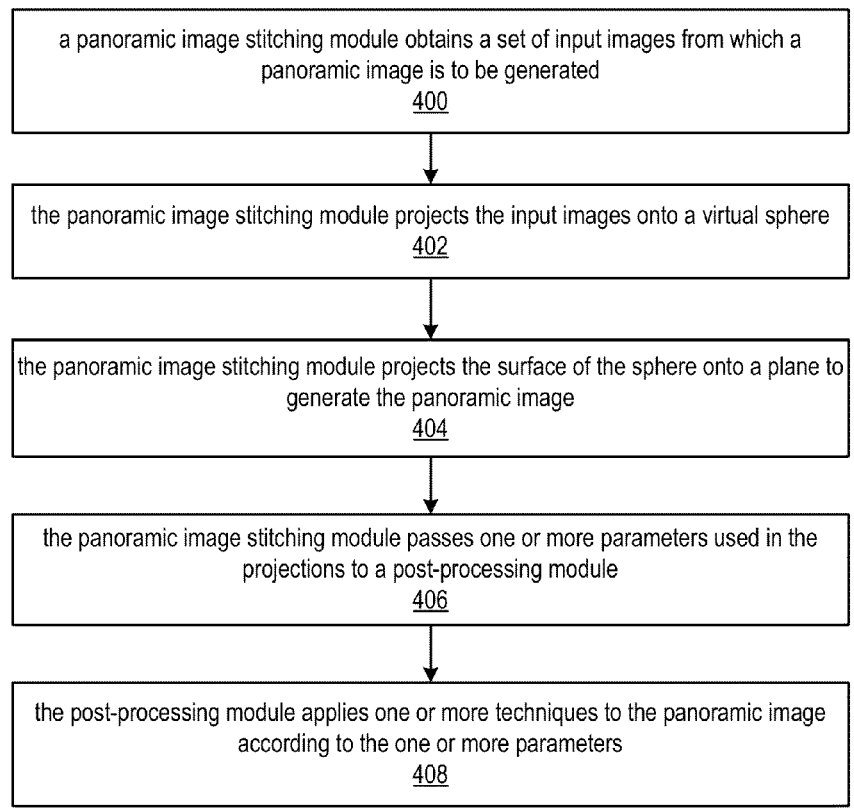
FIG. 4 is a flowchart of a method for a panoramic image stitching module to generate and pass projection models used for generating panoramic images to a post-processing module, according to at least some embodiments.

Methods for Interfacing Panoramic Image Stitching Technology with Post-processors FIGS. 2 through 4 are flowcharts of example methods for interfacing panoramic image stitching technology with technology that implements post-processing of the panoramic images generated by the panoramic image stitching technology, according to at least some embodiments.

FIG. 2 is a flowchart of a method that may be implemented in a panoramic image stitching module to generate and store projection models used for generating panoramic images, according to at least some embodiments. As indicate at 200, the panoramic image stitching module may obtain a set of input images from which a panoramic image is to be generated. As indicated at 202, the panoramic image stitching module may project the input images onto a virtual sphere. As indicated at 204, the panoramic image stitching module may then project the surface of the sphere onto a plane to generate the panoramic image. As indicated at 206, the panoramic image stitching module may store one or more parameters used in the projections of 202 and 204 in metadata for the panoramic image as a projection model.

FIG. 3 is a flowchart of a method that may be implemented in a post-processing module to access projection models generated and stored as metadata by a panoramic image stitching module, according to at least some embodiments. As indicated at 300, the post-processing module may access a panoramic image to be processed. As indicated at 302, the post-processing module may access metadata for the panoramic image to obtain the projection model used to generate the panoramic image. As indicated at 304, the post-processing module may apply one or more techniques (e.g., image processing techniques) to the panoramic image according to the projection model.

Figure 5:
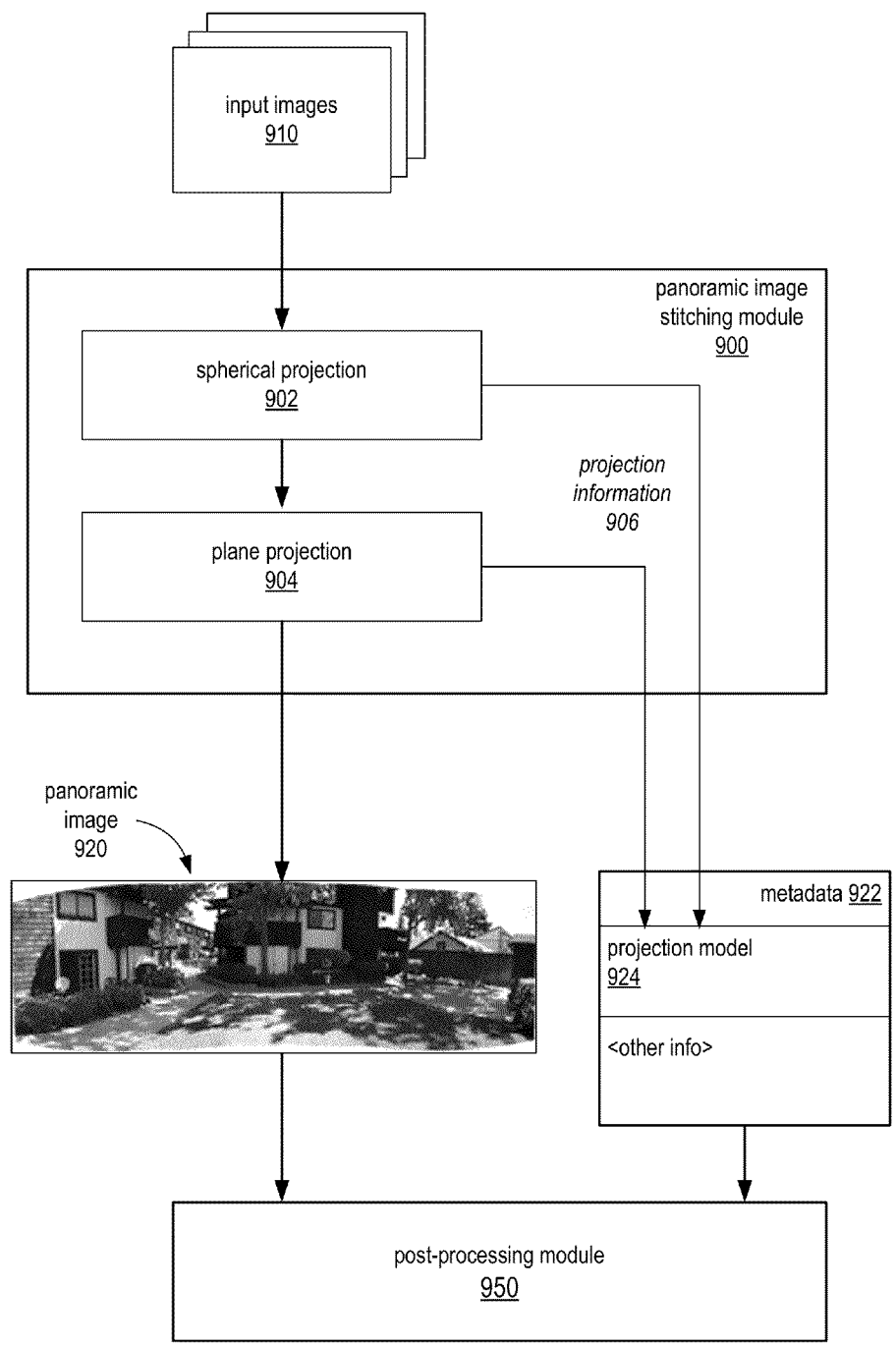
FIG. 5 illustrates example modules that implement methods as described herein, according to at least some embodiments.
Figure 6:
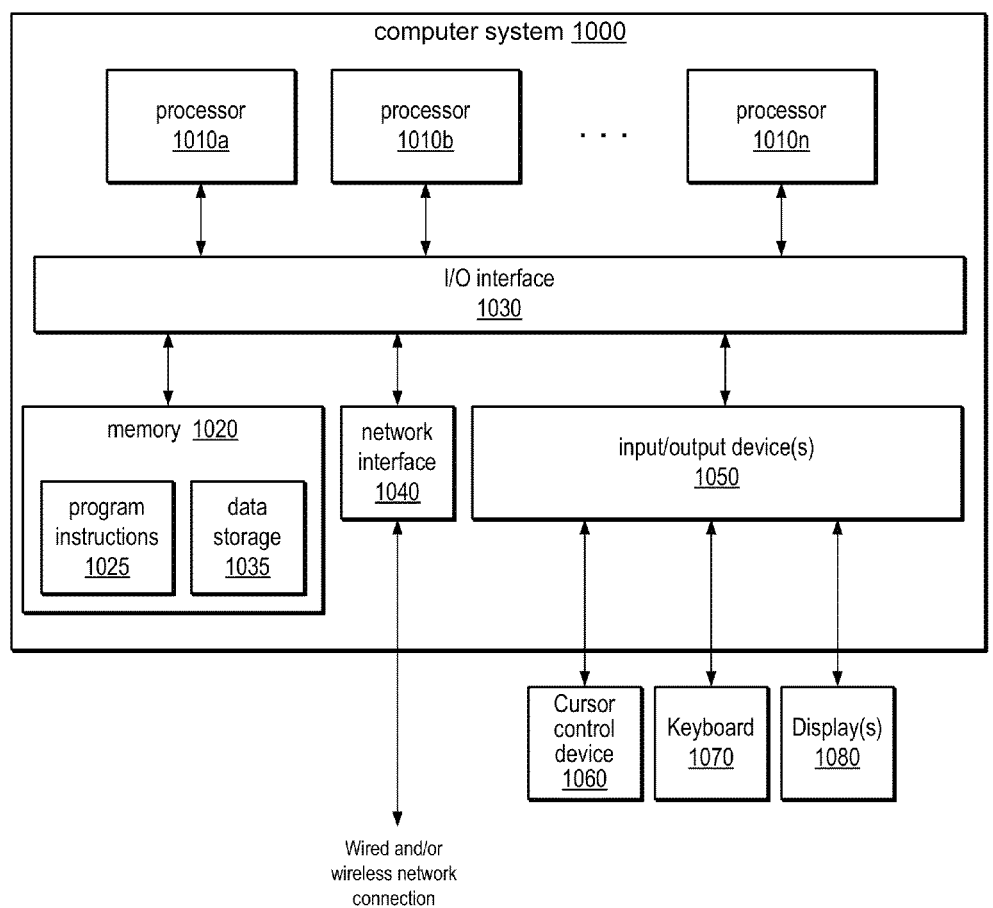
FIG. 6 illustrates an example computer system that may be used in embodiments.

In at least some embodiments of the methods as described in FIGS. 2 and 3, the post-processing module may be implemented as part of the same image processing application as the panoramic image stitching module. Alternatively, the post-processing module may be implemented in or as a different application than the panoramic image stitching module, and may be located on the same device as or on a different device than the panoramic image stitching module. FIG. 5 illustrates an example panoramic image stitching module and post-processing module implementation. FIG. 6 illustrates an example system on which either or both of the panoramic image stitching module and the post-processing module may be implemented.

FIG. 4 is a flowchart of a method for a panoramic image stitching module to generate and pass projection models used for generating panoramic images to a post-processing module, according to at least some embodiments. As indicated at 400, a panoramic image stitching module obtains a set of input images from which a panoramic image is to be generated. As indicated at 402, the panoramic image stitching module projects the input images onto a virtual sphere. As indicated at 404, the panoramic image stitching module projects the surface of the sphere onto a plane to generate the panoramic image. As indicated at 406, the panoramic image stitching module passes one or more parameters used in the projections to a post-processing module, for example in or as metadata for the panoramic image. As indicated at 408, the post-processing module applies one or more image processing techniques to the panoramic image according to the one or more projection model parameters.

Thus, at least some embodiments may include one or more post-processing modules configured to receive the one or more parameters used in the projections from the panoramic image stitching module and to perform one or more post-processing methods on the respective panoramic image according to the one or more projection parameters without obtaining user input specifying the projection parameters and without estimating a projection model for the panoramic image according to a mathematical analysis of the panoramic image. In at least some embodiments of the method as described in FIG. 4, the post-processing module(s) may be implemented as part of the same image processing application as the panoramic image stitching module. Alternatively, the post-processing module(s) may be implemented in or as a different application than the panoramic image stitching module, and may be located on the same device as or on a different device than the panoramic image stitching module. FIG. 5 illustrates an example panoramic image stitching module and post-processing module implementation. FIG. 6 illustrates an example system on which either or both modules may be implemented.

EXAMPLE POST-PROCESSORS

The following describes example post-processors that may be implemented as post-processing modules and that may access and use the projection model information stored as metadata by the panoramic image stitching module, for example as shown in FIGS. 2 and 3, or otherwise provided by the panoramic image stitching module, for example as shown in FIG. 4. These examples are not intended to be limiting. Other post-processors than those described may access and use the projection model information provided by the panoramic image stitching module to perform other image processing techniques on a respective panoramic image. In at least some embodiments, these example post-processors may be configured to receive one or more parameters used in projections from the panoramic image stitching module and to perform one or more post-processing methods as described on the respective panoramic image according to the one or more projection parameters received from the panoramic image stitching module without obtaining user input specifying the projection parameters and without estimating a projection model for the panoramic image according to a mathematical analysis of the panoramic image.

A first example post-processor takes an image with very wide field-of-view (e.g. wide angle perspective photos, fisheye photos, or a panoramic image generated by a panoramic image stitching module) as input. The post-processor turns or converts the original projection model into an ad-hoc adaptive projection. This post-processor may, for example, be used to reduce the impact of geometric distortions in such images. In the resulting ad-hoc adaptive projection, some salient lines will become straight. However, the post-processor may not be able to automatically decide which lines to straighten. This may require user input to specify the line(s), e.g. to indicate which straight lines on the image should remain straight in the final result.

In the above, a line does not refer to a straight line on the image, but instead refers to a straight line in the real scene. In projections such as fisheye projections, the real-world straight lines are bent. In some embodiments, this post-processor may only require that the user specifies the two end points when specifying a line, and then may determine the body of the line automatically. To do this, the post-processor would need to know the projection model.

For images other than panoramic images generated by a panoramic image stitching module, the post-processor may obtain a projection model from one of several places. Note that these other images are typically generated as a single image capture, and are not constructed from a set of images as is a panoramic image. Thus, the projection model may be available as metadata, in a lens profile, or may be obtained by user input. For panoramic images generated by panoramic image stitchers, however, conventionally there is no projection model provided with the image, and as noted above the concept of a projection model for such a panoramic image would be difficult to obtain via a user interface, as general users may not even understand the concepts. A particular difficulty for such panoramic images is that, unlike the other types of images that the post-processor may process, the lens center is not necessary the image center, which adds to the complexity of manually specifying the projection model.

Embodiments of the methods as described herein may be used with the above-described post-processing module to provide metadata describing the projection model used to generate a panoramic image so that the post-processor does not have to do the difficult mathematics to try to estimate the projection model from the panoramic image, and does not have to provide a user interface via which the user is required to specify the projection model for such panoramic images.

In at least some embodiments, when the above-described post-processor opens a panoramic image, the post-processor may access the metadata and, if the projection model is available in the metadata, may display "Panoramic image" or the like as the projection model, and then may use the projection model read from the metadata to perform post-processing tasks. For example, when the user specifies the end points of a line, the projection model from the metadata may be used to complete or fill in the line so that it aligns with the real-scene line on the panoramic image.

Another example post-processor that may leverage the projection model stored in metadata for a panoramic image as described herein is a post-processor that generates a 3D full-spherical virtual scene from image(s). A panoramic image may be projected onto other geometric shapes than a plane, such as a sphere. The post-processor may place a virtual camera at the center of the view sphere and render the view sphere to the user. However, the output panoramic image of a panoramic image stitching module is on a plane, and conventional panoramic image stitching modules do not provide the projection model used to generate the panoramic image. Such a post-processor may access a panoramic image generated by the panoramic image stitching module described herein, access the virtual projection model used by the stitcher from the metadata as described herein, and use the projection model to project the panoramic image onto a sphere or other geometric shape.

The above post-processors are given by way of example, and any image processing module that works on panoramic images and that may need the projection model for any reason may access the projection model provided via the metadata for a panoramic image as described herein.

EXAMPLE IMPLEMENTATIONS

Some embodiments may include a means for interfacing panoramic image stitching technology with post-processing technology, as described herein. For example, a panoramic image stitching module may generate a panoramic image from a set of input images according to a projection model and provide one or more parameters of the projection model as metadata for the panoramic image to one or more other modules, as described herein. The module(s) may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform generating a panoramic image from a set of input images according to a projection model and providing one or more parameters of the projection model as metadata for the panoramic image to one or more other modules, as described herein. Other embodiments of the module(s) as described herein may be at least partially implemented by hardware circuitry and/or firmware stored, for example, in a non-volatile memory.

FIG. 5 illustrates modules that may implement methods for interfacing panoramic image stitching technology with post-processing technology as illustrated in FIGS. 2 through 4. FIG. 6 illustrates an example computer system on which embodiments of module 900 and/or module 950 may be implemented. Panoramic image stitching module 900 receives as input a set of input images from which a panoramic image is to be generated. A spherical projection 902 component of the panoramic image stitching module 900 may project the input images onto a virtual sphere, and then a plane projection 904 component of the panoramic image stitching module 900 may project the surface of the sphere onto a plane to generate the panoramic image 920. Panoramic image stitching module 900 generates as output panoramic image 920 and one or more parameters used in the projections performed by spherical projection 902 component and plane projection 904 component as a projection model 924 in metadata 922 for the panoramic image 920, as described herein. Post-processing module 950 may the access the panoramic image 920 and the metadata 922 to obtain the projection model 924 used to generate the panoramic image 920. The post-processing module 950 may apply one or more techniques (e.g., image processing techniques) to the panoramic image 920 according to the projection model 924.

Embodiments of modules 900 and/or 950 or one or more of the methods for interfacing panoramic image stitching technology with post-processing technology as illustrated in FIGS. 2 through 4 may be implemented as plug-in(s) for applications, as library functions, and/or as stand-alone application(s). Embodiments of the module(s) or one or more of the methods and algorithms as described herein may be implemented in any image processing application, including but not limited to Adobe® PhotoShop® Adobe® Photo-Shop® Elements®, Adobe® PhotoShop® Lightroom®, and Adobe® After Effects®. Adobe, PhotoShop, PhotoShop Elements, PhotoShop Lightroom, and Adobe After Effects are either registered trademarks or trademarks of Adobe Systems Incorporated in the United States and/or other countries.

EXAMPLE SYSTEM

Embodiments of the methods for interfacing panoramic image stitching technology with post-processing technology as illustrated in FIGS. 2 through 5 may be executed on one or more computer systems, which may interact with various other devices. One such computer system is illustrated by FIG. 6. In different embodiments, computer system 1000 may be any of various types of devices, including, but not limited to, a personal computer system, desktop computer, laptop, notebook, or netbook computer, pad or tablet device, mainframe computer system, handheld computer, workstation, network computer, a camera, a set top box, a mobile device, a wireless phone, a smart phone, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Computer system 1000 may also include one or more touch- or multitouch-enabled devices as input/output devices, for example a touch-enabled display and/or pad. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the methods for interfacing panoramic image stitching technology with post-processing technology as illustrated in FIGS. 2 through 5 are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 6, memory 1020 may include program instructions 1025, configured to implement embodiments of the methods for interfacing panoramic image stitching technology with post-processing technology as illustrated in FIGS. 2 through 5, and data storage 1035, comprising various data accessible by program instructions 1025. In one embodiment, program instructions 1025 may include software elements of embodiments of the methods for interfacing panoramic image stitching technology with post-processing technology as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of the methods for interfacing panoramic image stitching technology with post-processing technology as described herein. In particular, the computer system and devices may include any combination of hardware or software that can perform the indicated functions, including a computer, personal computer system, desktop computer, laptop, notebook, or netbook computer, pad or tablet device, mainframe computer system, handheld computer, workstation, network computer, a camera, a set top box, a mobile device, network device, internet appliance, PDA, wireless phones, smart phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    performing, by one or more computing devices:
        generating, by a panoramic image stitching module, a panoramic image from a set of input images according to a projection model by;
            projecting the input images onto a virtual sphere; and
            projecting the surface of the sphere onto a plane;
        passing, by the panoramic image stitching module to a post-processing module, one or more parameters of the projection model, including a virtual focal length for the virtual sphere onto which the input images are projected and an indication of a point at which the plane contacts the sphere, as metadata for the panoramic image; and
        applying, by the post-processing module, one or more image processing techniques, including a conversion of an original projection model for an image into an adaptive projection, to the panoramic image according to at least the virtual focal length and the indication of the point at which the plane contacts the sphere.

2. The method as recited in claim 1, wherein said:
    projecting the input images onto the virtual sphere according to at least one parameter of the projection model; and
    projecting the surface of the sphere onto the plane according to at least one parameter of the projection model to generate the panoramic image.

3. The method as recited in claim 2, wherein the one or more parameters of the projection model further include information indicating a particular transformation used in projecting the surface of the sphere onto the plane.

4. The method as recited in claim 3, wherein the particular transformation is one of perspective transformation, cylindrical transformation, or spherical transformation.

5. The method as recited in claim 1, wherein the virtual focal length indicates a radius of the sphere.

6. The method as recited in claim 1, wherein the post-processing module is a post-processing module configured to project one or more images onto a geometric shape to generate a three-dimensional (3D) virtual scene from the one or more images.

7. The method as recited in claim 1, wherein the post-processing module is configured to perform said applying one or more image processing techniques to the panoramic image according to the one or more parameters of the projection model without receiving user input specifying the one or more parameters of the projection model and without performing analysis of the panoramic image to estimate the one or more parameters of the projection model.

8. A non-transitory computer-readable storage medium storing program instructions, wherein the program instructions are computer-executable to implement:
    generating a panoramic image from a set of input images according to a projection model by;
        projecting the input images onto a virtual sphere;
        projecting the surface of the sphere onto a plane; and
        automatically storing one or more parameters of the projection model, including a virtual focal length for the virtual sphere onto which the input images are projected and an indication of a point at which the plane contacts the sphere, as metadata for the panoramic image, the metadata for the panoramic image configured to be accessed to perform one or more post-processing techniques on the panoramic image, including a projection of one or more images onto a geometric shape to generate a three-dimensional (3D) virtual scene from the one or more images, according to at least the virtual focal length and the indication of the point at which the plane contacts the sphere of the one or more parameters of the projection model stored as the metadata for the panoramic image.

9. The non-transitory computer-readable storage medium as recited in claim 8, wherein, in said generating the panoramic image from the set of input images according to the projection model, the program instructions are computer-executable to implement said:
    projecting the input images onto the virtual sphere according to at least one parameter of the projection model; and
    projecting the surface of the sphere onto the plane according to at least one parameter of the projection model to generate the panoramic image.

10. The non-transitory computer-readable storage medium as recited in claim 9, wherein the one or more parameters of the projection model further include information indicating a particular transformation used in projecting the surface of the sphere onto the plane.

11. The non-transitory computer-readable storage medium as recited in claim 10, wherein the particular transformation is one of perspective transformation, cylindrical transformation, or spherical transformation.

12. The non-transitory computer-readable storage medium as recited in claim 8, wherein the virtual focal length indicates a radius of the sphere.

13. The non-transitory computer-readable storage medium as recited in claim 8, wherein the program instructions are further computer-executable to implement, subsequent to said storing:
   accessing the one or more parameters of the projection model stored as the metadata for the panoramic image; and
   applying one or more image processing techniques to the panoramic image according to the one or more parameters of the projection model.

14. A system, comprising:
   one or more processors; and
   a memory comprising program instructions that are executable by at least one of the one or more processors to implement a panoramic image stitching module operable to:
      generate a panoramic image from a set of input images according to a projection model to;
         project the input images onto a virtual sphere; and
         project the surface of the sphere onto a plane;
      store one or more parameters of the projection model, including a virtual focal length for the virtual sphere onto which the input images are projected and an indication of a point at which the plane contacts the sphere, as metadata for the panoramic image, the metadata for the panoramic image configured to be accessed to perform one or more post-processing techniques on the panoramic image, including a conversion of an original projection model for an image into an adaptive projection, according to at least the virtual focal length and the indication of the point at which the plane contacts the sphere of the one or more parameters of the projection model stored as the metadata for the panoramic image.

15. The system as recited in claim 14, wherein, to generate the panoramic image from the set of input images according to the projection model, the program instructions are executable by at least one of the one or more processors to said:
   project the input images onto the virtual sphere according to at least one parameter of the projection model; and
   project the surface of the sphere onto the plane according to at least one parameter of the projection model to generate the panoramic image.

16. The system as recited in claim 15, wherein the one or more parameters of the projection model further include information indicating a particular transformation used in projecting the surface of the sphere onto the plane.

17. The system as recited in claim 16, wherein the particular transformation is one of perspective transformation, cylindrical transformation, or spherical transformation.

18. The system as recited in claim 14, wherein the virtual focal length indicates a radius of the sphere.

19. The system as recited in claim 14, wherein the program instructions are further executable by at least one of the one or more processors to implement another module operable to:
   access the one or more parameters of the projection model stored as the metadata for the panoramic image; and
   apply one or more image processing techniques to the panoramic image according to the one or more parameters of the projection model.

20. The system as recited in claim 14, wherein the one or more post-processing techniques on the panoramic image includes a projection of one or more images onto a geometric shape to generate a three-dimensional (3D) virtual scene from the one or more images.

21. The non-transitory computer-readable storage medium as recited in claim 8, wherein the one or more post-processing techniques on the panoramic image include a conversion of an original projection model for an image into an adaptive projection.

* * * * *